July 28, 1953   B. CROWTHER   2,646,690
POWER-TRANSMISSION ADJUSTING DEVICE
Filed Jan. 7, 1948
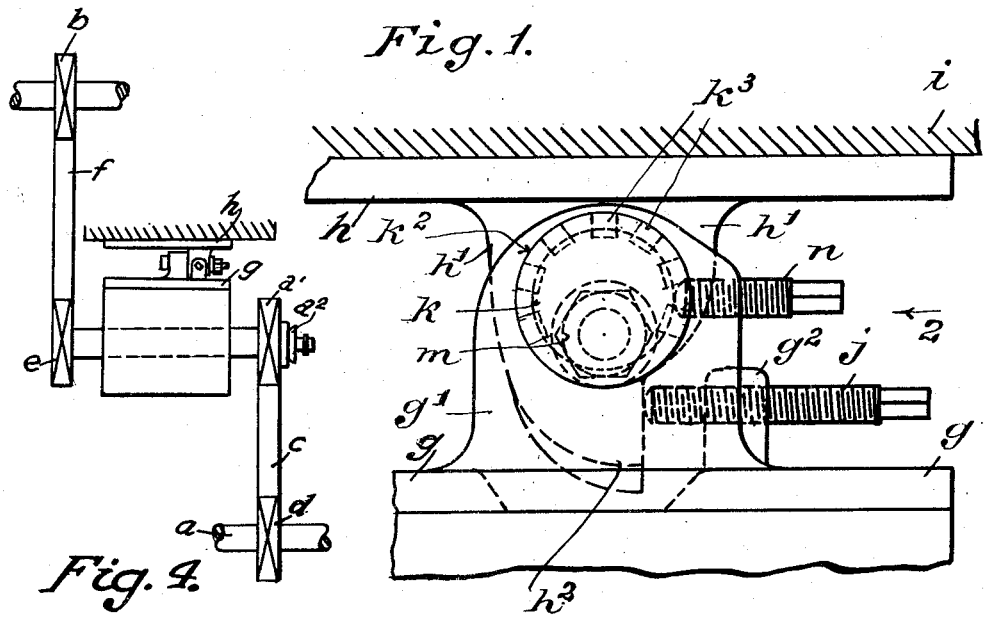
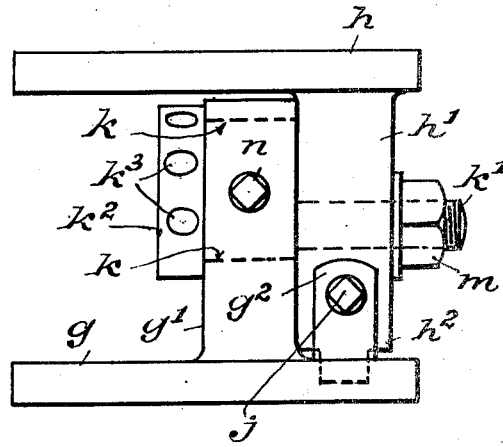
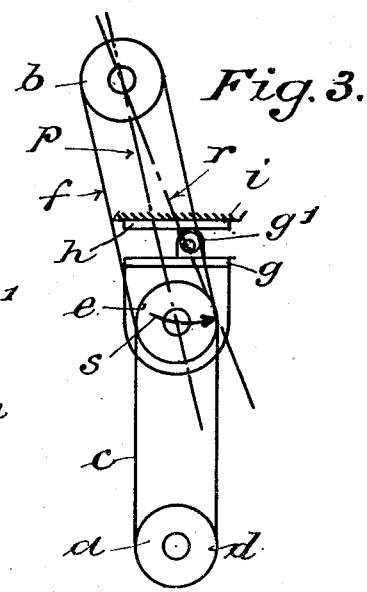
Inventor
Bernard Crowther Patented July 28, 1953

2,646,690

UNITED STATES PATENT OFFICE 2,646,690

POWER-TRANSMISSION ADJUSTING DEVICE

Bernard Crowther, Harden, near Bingley, England, assignor to Flexicon Card Services, Limited, Bradford, England Application January 7, 1948, Serial No. 955
In Great Britain January 8, 1947

6 Claims. (Cl. 74—242.16)

My invention relates to power-transmission devices and particularly to such devices as employed in connection with power-driven sewing machines.

It is common, in a power-driven sewing machine, to provide beneath the bench of the machine a driving shaft from which a drive is taken by belt to a pulley on what is termed a transmitter, that is to say a mechanism incorporating an input pulley, a clutch and an output pulley, the latter pulley being connected by belt to the driven pulley of the sewing machine.

It is desirable, and in fact necessary, to provide means for adjusting the tension of the two belts, namely that connecting the driving shaft to the transmitter, and which I shall refer to as the bottom belt, and that for connecting the transmitter to the driving pulley of the machine and which I shall refer to as the top belt.

It is an object of the present invention to make possible or to facilitate the adjustment of the tension of the top and bottom belts, either independently or together. This I propose to do by providing between the frame or casing of the transmitting unit and the underside of the machine bench what I term an adjuster.

This adjuster takes the form of an upstanding lug on the transmitter frame or on a part secured to such frame, and of a part or plate secured to the underside of the machine bench and provided with a depending lug. An eccentric engaging in an opening in one of the lugs referred to has projecting from one of its faces a spindle which extends rotatably through an opening in the other lug, so that by means of a nut on the threaded extremity of the spindle the two lugs can be secured in any desired position of relative angular adjustment. A set screw, passing through a threaded opening in a part on the lug through which the eccentric passes, is arranged to bear against a projection on the other lug in such manner that by appropriate rotation of the set screw the transmitter can be caused to move pivotally towards or away from the driving shaft.

The tension of the top belt is adjusted by appropriate rotation of the eccentric, and that of the bottom belt by appropriate adjustment of the angular position of the transmitter.

In the accompanying drawing,

Fig. 1 is a front elevation of an adjuster device according to the invention; and Fig. 2 is an end view of the same looking in the direction of the arrow 2 in Fig. 1;

Fig. 3 is a diagram illustrating the preferred setting or arrangement of the adjuster in relation respectively to the driving shaft and to the driven pulley of the machine; and Fig. 4 is a side view of the structure of Fig. 3.

Referring to the drawing, $a$ represents a driving shaft from which motion is to be transmitted to the driven pulley of the machine, indicated at $b$. The transmitting unit, incorporating in known manner an input pulley $d^1$ mounted on shaft $d^2$ and driven by a belt $c$ from a pulley $d$ on the driving shaft $a$, a clutch and an output pulley $e$ also mounted on shaft $d^2$ and connected by a belt $f$ to the driving pulley $b$ of the machine (Fig. 4), is carried by a plate or part $g$ having an upstanding lug $g'$.

A plate or part $h$ secured to the underside of the machine bench $i$ has a depending lug $h'$, a projection $h^2$ on which is adapted to be engaged by a set screw $j$ working through a threaded opening in a part $g^2$ on the plate $g$.

The depending lug $h'$ on the part $h$ secured to the machine bench has an opening in which is rotatable an eccentric $k$, from one face of which there projects a spindle $k'$ which extends through an opening in the lug $g'$. A nut $m$ working on the threaded extremity of the spindle $k'$ enables the two lugs $g'$ and $h'$ to be clamped together in any desired relative angular position.

By turning the eccentric $k$, the distance between the centre of the output pulley $e$ of the transmitting unit and that of the driving pulley $b$ of the machine can be varied and appropriate adjustment be made in the tension of the top belt $f$. To enable the eccentric to be turned it may conveniently have associated with it a disc $k^2$ provided with radial holes $k^3$ in its periphery for the insertion of a purchase bar.

To enable the eccentric to be locked in the desired position of adjustment, a set screw $n$ passing radially through a threaded hole in the lug $g'$ may engage and bear against the periphery of the eccentric. Alternatively, or in addition to the set screw $n$ the spindle $k'$ may have a conical portion adapted to be drawn, by tightening of the clamping nut $m$, into a tapered portion of the hole in the lug $g'$ through which the spindle passes.

When applying the adjuster it is preferable, after slackening of the securing nut $m$, to adjust and lock the eccentric $k$ to adjust the tension of the top belt $f$. There remains then to adjust the tension of the bottom belt $c$, if this is necessary, and this is done by means of the set screw $j$.

It is desirable that, after adjustment of the tension of the top belt $f$, any angular adjustment of the transmitting unit in a direction to tighten the bottom belt c shall be in a direction to tighten the top belt. To this end it is preferable to arrange for the centre of the spindle k' carrying the eccentric k, that is to say the centre about which the transmitting unit pivots, to be suitably offset from the line p joining the centre of the output pulley e of the unit to the driving pulley b on the machine so that any angular adjustment necessary to be given to the transmission unit will always cause the centre of the pulley e to move towards the line r joining the pivot centre of the transmission unit to the centre of the driving pulley b of the machine, as indicated by the arrow s in Fig. 3 and never past that line, since obviously any movement past the line will tend to slacken the top belt f whilst movement towards the line will not only tighten the bottom belt c but will also tend to tighten, though only slightly, the top belt f. Thus the adjustment of tension of the bottom belt does not affect materially the pre-adjusted tension of the top belt.

Having thus described my invention, what I claim as new and desire to secure by Letters Patent is:

1. A power transmission device comprising, in combination, a driving pulley; an input pulley connected by a belt to said driving pulley; a shaft fixedly connected to said input pulley so as to rotate therewith; an output pulley fixedly connected to said shaft so as to rotate with said input pulley; a driven pulley connected by a belt to said output pulley; a frame on which said shaft is rotatably mounted; a projection connected to said frame and formed with a cylindrical bore passing therethrough; a fixedly mounted member located in abutting relation with said projection and also being formed with a bore passing therethrough, said last-mentioned bore being of a substantially smaller diameter than said first-mentioned bore and being located out of the center line of said first-mentioned cylindrical bore; an eccentric having an enlarged portion located in said first-mentioned bore and having another portion thereof extending through said second-mentioned bore; means for rotating said eccentric so that said projection of said frame may be moved longitudinally with respect to said fixedly mounted member, whereby said frame and output pulley are moved toward or away from said driven pulley to adjust the tension on said belt connecting said output pulley and said driven pulley; and means for pivoting said projection about said portion of said eccentric which extends through said bore of said fixedly mounted member so as to adjust the distance between said driving pulley and said input pulley.

2. A power transmission device comprising, in combination, a driving pulley; an input pulley connected by a belt to said driving pulley; a shaft fixedly connected to said input pulley so as to rotate therewith; an output pulley fixedly connected to said shaft so as to rotate with said input pulley; a driven pulley connected by a belt to said output pulley; a frame on which said shaft is rotatably mounted; a projection connected to said frame and formed with a cylindrical bore passing therethrough; a fixedly mounted member located in abutting relation with said projection and also being formed with a bore passing therethrough, said last-mentioned bore being of a substantially smaller diameter than said first-mentioned bore and being located out of the center line of said first-mentioned cylindrical bore; an eccentric having an enlarged portion located in said first-mentioned bore and having another portion thereof extending through said second-mentioned bore; means for rotating said eccentric so that said projection of said frame may be moved longitudinally with respect to said fixedly mounted member to adjust the tension on said belt connecting said output pulley and said driven pulley; and means for pivoting said projection about the center of said portion of said eccentric which extends through said bore of said fixedly mounted member and for moving said input pulley toward the line connecting the center of said driven pulley with said center of said last-mentioned portion of said eccentric.

3. A power transmission device comprising, in combination, a driving pulley; an input pulley connected by a belt to said driving pulley; a shaft fixedly connected to said input pulley so as to rotate therewith; an output pulley fixedly connected to said shaft so as to rotate with said input pulley; a driven pulley connected by a belt to said output pulley; a frame on which said shaft is rotatably mounted; a projection connected to said frame and formed with a cylindrical bore passing therethrough; a fixedly mounted member located in abutting relation with said projection and also being formed with a bore passing therethrough, said last-mentioned bore being of a substantially smaller diameter than said first-mentioned bore and being located out of the center line of said first-mentioned cylindrical bore; an eccentric having an enlarged portion located in said first-mentioned bore and having another portion thereof extending through said second-mentioned bore; means for rotating said eccentric so that said projection of said frame may be moved longitudinally with respect to said fixedly mounted member, said last-mentioned means comprising a disc connected to said enlarged portion of said eccentric and being formed with a plurality of recesses so that said disc may be rotated in order to rotate said eccentric therewith; and means for pivoting said projection about the center of said portion of said eccentric which extends through said bore of said fixedly mounted member to adjust the distance between said driven pulley and output pulley.

4. A power transmission device comprising, in combination, a driving pulley; an input pulley connected by a belt to said driving pulley; a shaft fixedly connected to said input pulley so as to rotate therewith; an output pulley fixedly connected to said shaft so as to rotate with said input pulley; a driven pulley connected by a belt to said output pulley; a frame on which said shaft is rotatably mounted; a projection connected to said frame and formed with a cylindrical bore passing therethrough; a fixedly mounted member located in abutting relation with said projection and also being formed with a bore passing therethrough, said last-mentioned bore being of a substantially smaller diameter than said first-mentioned bore and being located out of the center line of said first-mentioned cylindrical bore; an eccentric having an enlarged portion located in said first-mentioned bore and having another portion thereof extending through said second-mentioned bore; means for rotating said eccentric so that said projection of said frame may be moved longitudinally with respect to said fixedly mounted member to adjust the tension on said belt connecting said output pulley and said driven pulley; and means for pivoting said projection about the center of said portion of said eccentric which extends through said bore of said fixedly mounted member, said last-mentioned means comprising a projection formed on said fixedly mounted member and a threaded member rotatably mounted on said frame and bearing at one end against said last-mentioned projection, whereby when said screw threaded member is rotated said frame is pivoted about said last-mentioned portion of said eccentric.

5. A power transmission device comprising, in combination, a driving pulley; an input pulley connected by a belt to said driving pulley; a shaft fixedly connected to said input pulley so as to rotate therewith; an output pulley fixedly connected to said shaft so as to rotate with said input pulley; a driven pulley connected by a belt to said output pulley; a frame on which said shaft is rotatably mounted; a projection connected to said frame and formed with a cylindrical bore passing therethrough; a fixedly mounted member located in abutting relation with said projection and also being formed with a bore passing therethrough, said last-mentioned bore being of a substantially smaller diameter than said first-mentioned bore and being located out of the center line of said first-mentioned cylindrical bore; an eccentric having an enlarged portion located in said first-mentioned bore and having another portion thereof extending through said second-mentioned bore; means for rotating said eccentric so that said projection of said frame may be moved longitudinally with respect to said fixedly mounted member to adjust the tension on said belt connecting said output pulley and said driven pulley; and set screw means for maintaining said eccentric in its adjusted position in said bore of said projection of said frame.

6. A power transmission device comprising, in combination, a driving pulley; an input pulley connected by a belt to said driving pulley; an output pulley coaxial with said input pulley; transmission means operatively connected to said input and output pulleys for transmitting a drive from the former to the latter; a driven pulley connected by a belt to said output pulley; a frame carrying said transmission means and input and output pulleys connected thereto; a projection connected to said frame and formed with a cylindrical bore passing therethrough; a fixedly mounted member located in abutting relation with said projection and also being formed with a bore passing therethrough, said last-mentioned bore being of a substantially smaller diameter than said first-mentioned bore and being located out of the center line of said first-mentioned cylindrical bore; an eccentric having an enlarged portion located in said first-mentioned bore and having another portion thereof extending through said second-mentioned bore; means for rotating said eccentric so that said projection of said frame may be moved longitudinally with respect to said fixedly mounted member, whereby said frame and output pulley are moved toward or away from said driven pulley to adjust the tension on said belt connecting said output pulley and said driven pulley; and means for pivoting said projection about said portion of said eccentric which extends through said bore of said fixedly mounted member so as to adjust the distance between said driving pulley and said input pulley.

BERNARD CROWTHER.

References Cited in the file of this patent

UNITED STATES PATENTS

| Number | Name | Date |
|---|---|---|
| 1,467,591 | Riker | Sept. 11, 1923 |
| 1,580,308 | Lawson | Apr. 13, 1926 |
| 1,655,152 | Maier et al. | Jan. 3, 1928 |